(Model.)
W. MILLER.
Anti-Friction Axle Box.
No. 238,949.        Patented March 15, 1881.
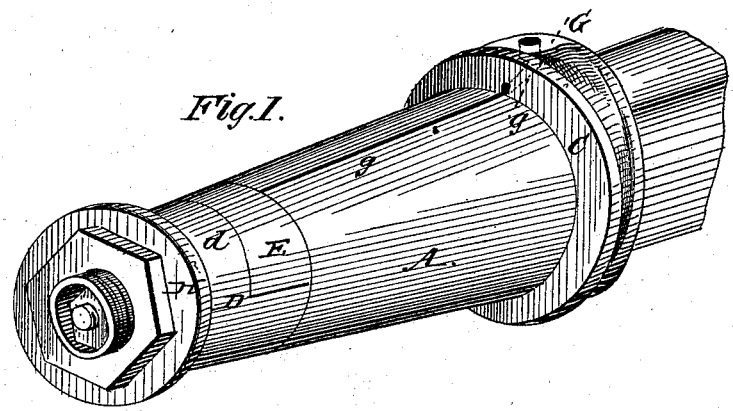
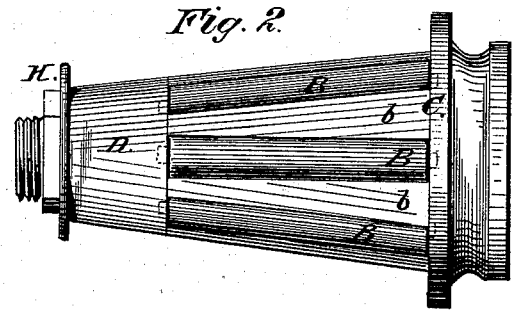
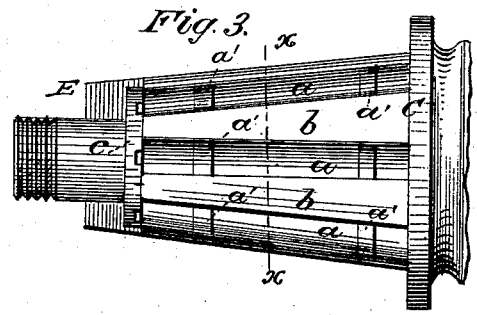
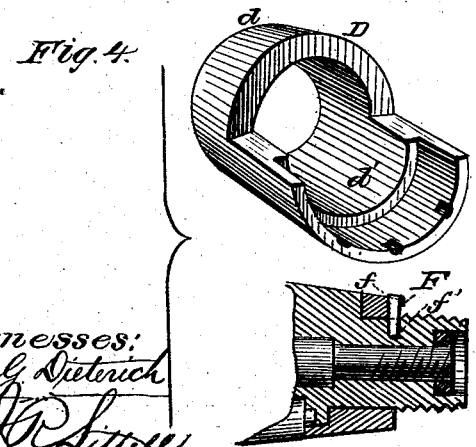
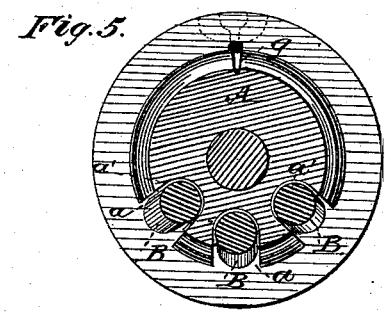
Witnesses:
Fred G. Dietrich
J. R. Little
Inventor:
William Miller,
by C. A. Snow & Co.
Attys.

UNITED STATES PATENT OFFICE.

WILLIAM MILLER, OF FORT WAYNE, INDIANA.

ANTI-FRICTION AXLE-BOX.

SPECIFICATION forming part of Letters Patent No. 238,949, dated March 15, 1881.

Application filed November 18, 1880. (Model.)

*To all whom it may concern:*

Be it known that I, WILLIAM MILLER, of Fort Wayne, in the county of Allen and State of Indiana, have invented certain new and useful Improvements in Anti-Friction Thimbles for Vehicles; and I do hereby declare that the following is a full, clear, and exact description of the invention, which will enable others skilled in the art to which it appertains to make and use the same, reference being had to the accompanying drawings, which form a part of this specification.

My invention relates to improvements in attachments for vehicle-axles; and it consists in providing an axle-thimble with anti-friction rollers, arranged as hereinafter more fully set forth, and pointed out in the claims.

In the annexed drawings, Figure 1 is a view of an axle with the thimble attached, showing oil-cup and groove. Fig. 2 is a view of the under side of the thimble, showing the anti-friction rollers in position. Fig. 3 is a view of the thimble with rollers and sleeve removed. Fig. 4 is a view of the sleeve that holds the rollers in place, and Fig. 5 is a cross-section on the line $x$ $x$.

Similar letters indicate like parts in the several views.

The body or frame A of the thimble is made of metal, cast in one piece, as shown in Fig. 3, and has a central perforation that fits over the end of the axle. Its outer surface or periphery, which forms the frustum of a cone, is provided with three or more converging grooves, $a$ $a$ $a$, located on the under side, for the reception of the anti-friction rollers B, which may be made of brass or steel. These rollers are cylindrical in form, and provided at each end with journals, that fit in bearings formed in the flanged shoulder C, near the large or inner end of the thimble, and in the half-collar $c$ near the opposite end. The grooves $a$ are provided with transverse ridges $a'$ $a'$, elevated slightly above their surfaces, that also serve as bearings for the rollers, to give them additional support and relieve undue strain.

Between the grooves $a$ $a$ are ribs $b$ $b$, the outer surfaces of which take the conical form of the thimble, being wider at their inner ends and gradually diminishing in width to the collar $c$.

The rollers B are held in place by a sleeve, D, which is provided at its outer end with a ring or shoulder, $d$, that fits against the shoulder E on the thimble, and at its inner end it has a recessed shoulder, $d'$, that fits over the collar $c$ and against the ends of the ribs $b$. Its upper or recessed portion is provided with half-round openings, that correspond with those on the collar $c$, and thus assist in forming bearings for the journals of the rollers B. The sleeve D is secured in place by a notched bolt or pin, F, that enters a groove, $f$, in the outer end of the sleeve, and may be forced into a small opening or recess, $f'$, in the side of the thimble, so as to be readily removed, when desired, for the purpose of detaching the parts.

An oil-cup, G, is formed on the upper part of the thimble, near its inner end, and communicates with a groove, $g$, by means of which the parts of the thimble and axle-box surrounding it may be properly lubricated without the necessity of removing the wheel.

The thimble is attached to the axle-box and hub by means of a nut or washer, H, and to the axle by means of a screw-threaded bolt that passes in from its open outer end; or these parts may be united in any other appropriate manner.

From the foregoing description the operation and advantages of my improved devices will be readily understood.

When applied to the axles of wagons and other heavy vehicles the draft is made much more easy through the diminished amount of friction, and the liability of strain to the hub and axle is in a great measure avoided.

The manner in which the rollers are attached to the thimble and confined in their bearings by the shouldered and recessed sleeve renders it easy to remove them whenever desired, and at the same time prevents the entrance of sand and grit to impede their efficiency.

Having thus described my invention, what I claim as new, and desire to secure by Letters Patent, is—

1. The axle-thimble A, having grooves $a$, provided with ridges $a'$ $a'$, and flanged shoulder C, and half-collar $c$, provided with bearings for the journals of the anti-friction rollers B, substantially as shown and described.

2. The combination, with the thimble A, having oil-cup G and groove $g$, shoulders C E, collar $c$, ribs $b$, and grooves $a$, of the anti-friction rollers B and sleeve D, having shoulders $d$ $d'$, substantially as and for the purpose specified.

3. The combination, with the grooved thimble A and anti-friction rollers B, of the recessed and shouldered sleeve D, secured by the notched pin F, substantially as set forth.

In testimony that I claim the foregoing as my own I have hereto affixed my signature in presence of two witnesses.

WILLIAM MILLER.

Witnesses:
J. R. LITTELL,
C. K. ALLEN.